United States Patent
Krampl et al.

(10) Patent No.: US 12,362,845 B2
(45) Date of Patent: Jul. 15, 2025

(54) CONCEPT FOR A PREAMBLE FOR A POINT TO MULTIPOINT NETWORK

(71) Applicant: Intel Corporation, Santa Clara, CA (US)

(72) Inventors: Gerfried Krampl, Villach (AT); Rainer Strobel, Munich (DE)

(73) Assignee: Intel Corpororation, Santa Clara, CA (US)

( * ) Notice: Subject to any disclaimer, the term of this patent is extended or adjusted under 35 U.S.C. 154(b) by 227 days.

(21) Appl. No.: 17/998,544

(22) PCT Filed: Jun. 10, 2021

(86) PCT No.: PCT/US2021/036715
§ 371 (c)(1),
(2) Date: Nov. 11, 2022

(87) PCT Pub. No.: WO2021/252706
PCT Pub. Date: Dec. 16, 2021

(65) Prior Publication Data
US 2023/0208542 A1    Jun. 29, 2023

Related U.S. Application Data

(60) Provisional application No. 63/038,141, filed on Jun. 12, 2020.

(51) Int. Cl.
*H04B 10/27* (2013.01)
*H04J 3/06* (2006.01)

(52) U.S. Cl.
CPC ............ *H04J 3/0605* (2013.01); *H04B 10/27* (2013.01)

(58) Field of Classification Search
CPC ...................................... H04B 10/27
See application file for complete search history.

(56) References Cited

U.S. PATENT DOCUMENTS

| | | | |
|---|---|---|---|
| 2011/0103455 A1 | 5/2011 | Forrester et al. | |
| 2013/0294782 A1 | 11/2013 | Liboiron-Ladouceur et al. | |
| 2014/0341561 A1 | 11/2014 | Effenberger et al. | |
| 2015/0319028 A1 | 11/2015 | Razmtouz | |
| 2019/0074910 A1* | 3/2019 | Seo ........................ | H04B 10/69 |
| 2020/0201604 A1* | 6/2020 | Felix ....................... | G06N 3/08 |
| 2021/0289274 A1* | 9/2021 | Khotimsky ........ | H04Q 11/0067 |

* cited by examiner

*Primary Examiner* — Nathan M Cors
(74) *Attorney, Agent, or Firm* — 2SPL Patent Attorneys PartG mbB; Kieran O'leary

(57) ABSTRACT

Various examples relate to a concept for generating and using a preamble for transmissions in a point-to-multipoint network, such as a Passive Optical Network (PON). A preamble generation apparatus for generating a preamble for a communication over an optical network comprises circuitry that is configured to generate a first subsection of the preamble, the first subsection of the preamble comprising a repetitive signal pattern. The preamble generation apparatus is configured to generate a second subsection of the preamble subsequent to the first subsection, the second subsection comprising a pseudorandom signal sequence.

21 Claims, 3 Drawing Sheets

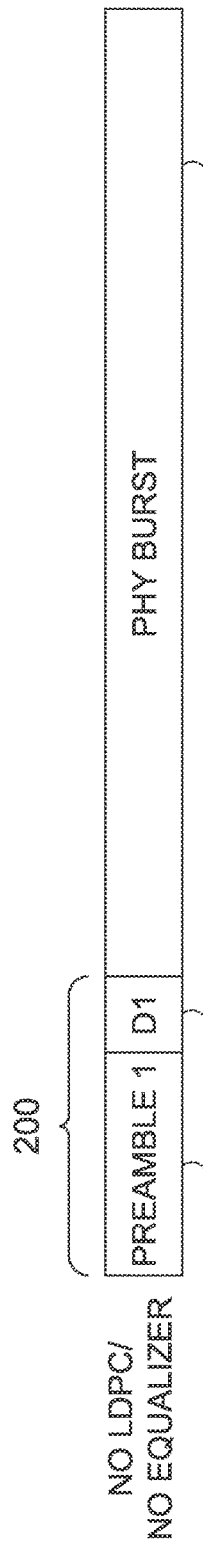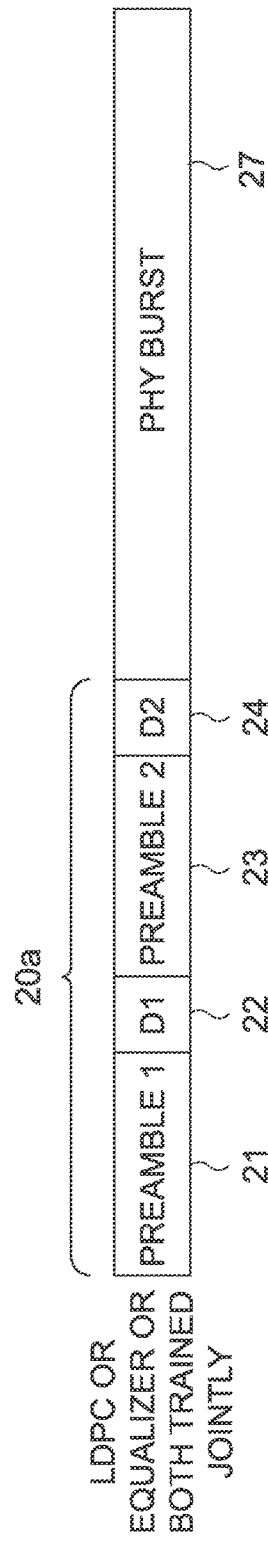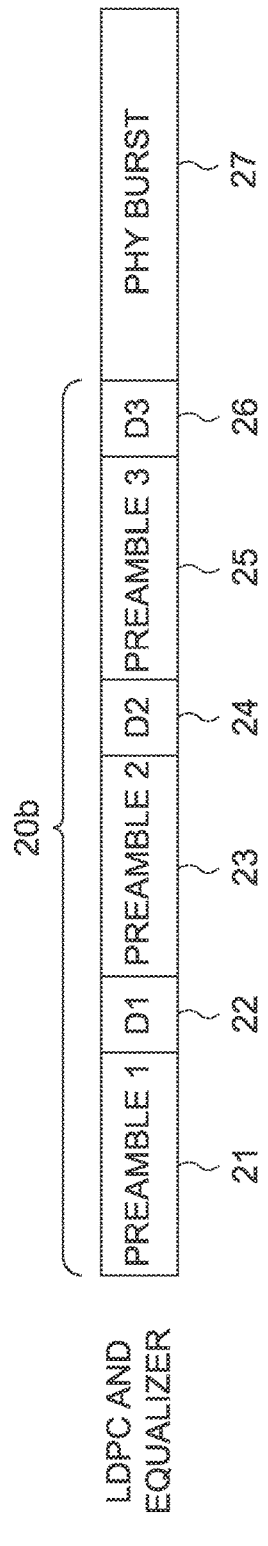

CONCEPT FOR A PREAMBLE FOR A POINT TO MULTIPOINT NETWORK

FIELD

Various examples relate to a concept for generating and using a preamble for transmissions in a point-to-multipoint network, such as a Passive Optical Network (PON).

BACKGROUND

Data rates in passive optical networks (PON) are increasing, e.g., to 25 Gbit/s or 50 Gbit/s per wavelength. With increasing transmission speed, the quality of signal transmission reduces. For user data (i.e., payload data), this may be mitigated by improved forward error correction (FEC). Soft decision FECs such as Low-Density Parity Check (LDPC) codes are a candidate for the next generation PON transmission, as they can operate close to channel capacity and hardware-friendly encoder and decoder implementations exist. In contrast to prior arts FEC solutions, soft decision FECs rely on knowledge of the channel quality and signal statistics to work efficiently.

In addition, nonlinear digital equalization methods such as MLSE (Maximum Likelihood Sequence Estimation) or BCJR (named after its authors Bahl, Cocke, Jelinek and Raviv) are considered for higher speed PONs. As a PON is a point-to-multipoint transmission system, the upstream transmission is done in bursts where each upstream burst from a certain ONU (optical networking unit) to the OLT (optical line termination), starts with a preamble that is known to the receiver and used, e.g., for timing recovery.

BRIEF DESCRIPTION OF THE FIGURES

Some examples of apparatuses and/or methods will be described in the following by way of example only, and with reference to the accompanying figures, in which

FIGS. 2a to 2c show examples of data bursts comprising various examples of preambles;

DETAILED DESCRIPTION

Figure 1A:
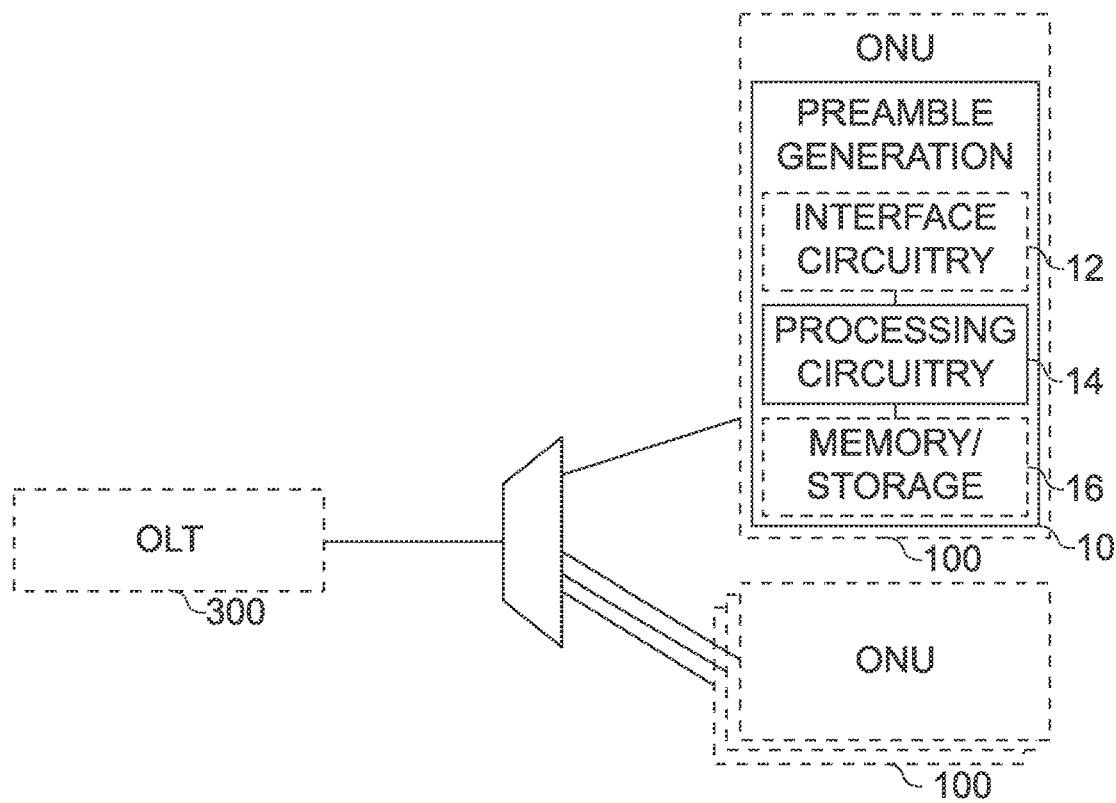
FIG. 1a shows a block diagram of an example of a preamble generation apparatus or preamble generation device, and of an optical networking unit comprising such a preamble generation apparatus or preamble generation device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Various examples of the present disclosure relate to transmitters and receivers communicating with one another using a preamble, e.g., using data bursts that comprise preamble. For example, various examples may relate to a transmitter for an optical network, a receiver for an optical network, and a data stream.

FIG. 1a shows a block diagram of an example of a preamble generation apparatus 10 or preamble generation device 10, and of an optical networking unit 100 comprising such a preamble generation apparatus 10 or preamble generation device 10. In the following, the preamble generation apparatus 10 and the preamble generation device 10 are described together. The components of the preamble generation device 10 are defined as component means, which correspond to the respective structural components of the preamble generation apparatus 10. Both the preamble generation apparatus and the corresponding device are suitable for generating a preamble for a communication over an optical network. The preamble generation apparatus comprises circuitry, configured to perform the functionality of the preamble generation apparatus. Accordingly, the preamble generation device comprises corresponding means for performing the same functionality as the preamble generation apparatus. For example, the preamble generation apparatus 10 may comprise processing circuitry 14, which may implement means for processing 14 of the preamble generation device, and which may be configured to perform the functionality of the preamble generation apparatus. Additionally, the preamble generation apparatus 10 may comprise interface circuitry 12 and memory/storage circuitry 16, which may correspond to means for communicating 12 and means for storing information 16 of the preamble generation device 10, and which may be used for transmitting and receiving information, and for storing and retrieving information, respectively. In the following, if the preamble generation apparatus is configured to perform an action, the respective action may be performed by the respective circuitry of means of the preamble generation apparatus, or by the corresponding method or computer program.

In the following, the concept is illustrated with respect to the preamble generation apparatus 10. Features introduced with respect to the preamble generation apparatus 10 may likewise be introduced in the corresponding preamble generation device 10.

The preamble generation apparatus 10 is configured to generate a first subsection of the preamble. The first subsection of the preamble comprises a repetitive signal pattern. The preamble generation apparatus is configured to generate a second subsection of the preamble subsequent to the first subsection, with the second subsection comprising a predetermined signal sequence.

FIG. 1a further shows an optical networking unit (ONU) 100 for a PON, the ONU comprising the preamble generation apparatus 10 or preamble generation device 10. FIG. 1a further shows a system comprising an Optical Line Terminal (OLT) 300 for the PON and one or more ONUs 100 with the preamble generation apparatus/device 10.

In the context of the present disclosure, the concept is introduced with respect to optical networks. However, the same context may be applied to other (wired) point-to-multipoint networks as well. In this case, the entities denoted as ONU and OLT may be denoted as distributed unit and central unit, respectively.

Figure 1B:
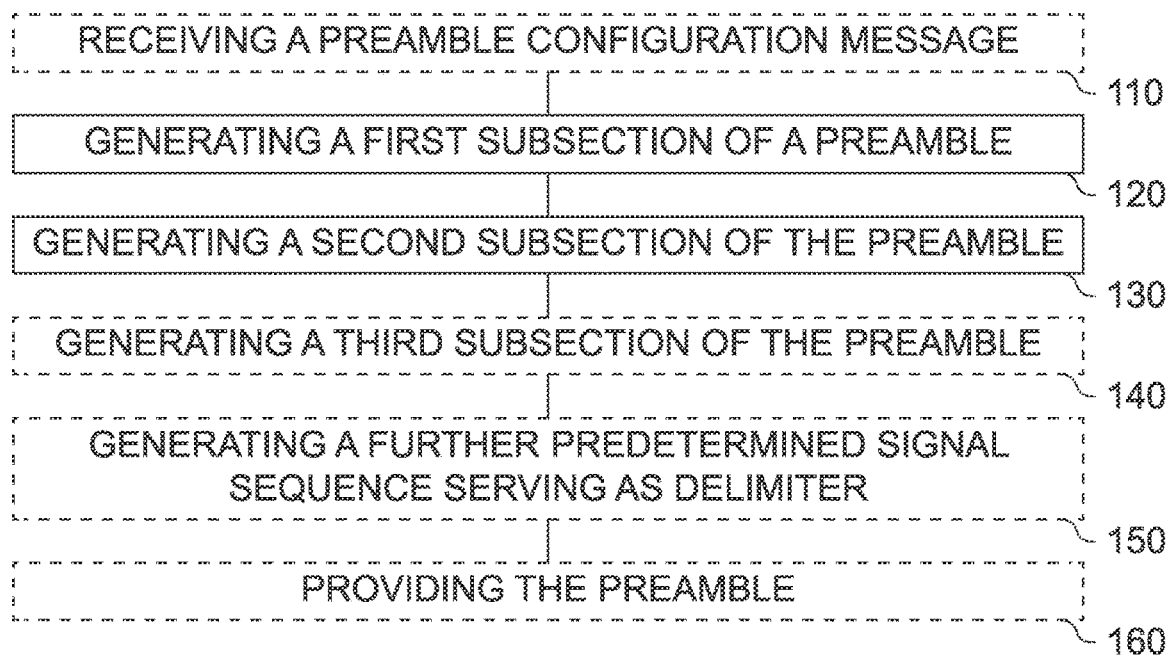
FIG. 1b shows a flow chart of an example of a preamble generation method.

FIG. 1b shows a flow chart of an example of a corresponding preamble generation method. The method comprises generating 120 the first subsection of the preamble. The method comprises generating 130 the second subsection of the preamble subsequent to the first subsection.

The following description relates to the preamble generation apparatus 10 or preamble generation device 10, to the corresponding method, and to a corresponding computer program. Features introduced with respect to the preamble generation apparatus 10 may likewise be introduced in the corresponding preamble generation device, method and computer program (and vice versa).

Various aspects of the present disclosure relate to a concept for generating a preamble for upstream transmissions in a point-to-multipoint network, such as a passive optical network. In point-to-multipoint networks, a central unit (i.e., the "point", e.g. the OLT in PON) communicates with a plurality of distributed units (i.e., the "multipoints", e.g., the ONUs in PON), which, usually, do not communicate among each other. Therefore, a plurality of transmission channels are created between the central unit and the distributed units, with each transmission channel having individual transmission properties that may be taken into account for transmissions between the central unit and the distributed units. For example, the upstream in a PON is a TDM scheme of bursts of data from different ONUs. Each ONU to OLT path forms its own transmission channel (from the LDPC point of view). In order to differentiate bit-errors caused by the PMD receiver's settling phase (which shall not be subject to LDPC correction) and bit-errors caused by the ONU specific channel (which are subject to LDPC correction) a structured preamble, as introduced in the proposed concept, may be provided. In the following the concept is illustrated, without loss in generality, for the communication between an OLT and an ONU, which are examples of a central unit and a distributed unit. Accordingly, the preamble may be generated for the upstream communication in the passive optical network, or more generally, for upstream communication in the (wired) point-to-multipoint network.

The proposed concept relates to upstream transmissions from the individual ONUs to the OLT. In general, the individual ONUs perform upstream transmissions as upstream data bursts, which are received and decoded by the OLT. The upstream data bursts generally comprise a preamble, which is used for clock data recovery, and payload data, which includes the data to be transmitted. For example, the payload data may further comprise forward error correction data to be used for checking the payload data for errors and/or for recovering from the errors. In legacy TDM (Time Division Multiplexed)-PON upstream transmission (10G and below), the preamble serves the purpose of letting the burst mode receiver PMD (optics, serdes) find its input power level and to let the CDR lock in order to produce meaningful bits to the Reed-Solomon (RS) based FEC decoder. To support or facilitate higher-complexity equalization and forward error correction schemes that may enable higher data transmissions rates, in addition to the first subsection of the preamble, which is used for clock data recovery, the preamble according to the proposed concept comprises at least one additional subsection, i.e., the second subsection, and an optional third subsection, which may be used for gathering information to be used for the forward error correction and/or for training the non-linear equalizer. In other words, for higher data-rate PON, soft decision FECs such as Low-Density-Parity-Check (LDPC) codes may be used for forward error correction, as they achieve lower output bit error rates at a given input bit error rate.

Soft decision FECs like LDPC take advantage of information about the channel quality. This information may be given to the LDPC code in terms of log-likelihood ratio (LLR) values, for example. Using a second preamble subsection comprising a predetermined signal sequence, such as a pseudorandom signal sequence may allow to determine the signal statistics required for a soft decision forward error correction decoder upon receipt of a single preamble, which way allow to use such decoders in applications where subsequent communication bursts originate from different senders, such as the different ONUs of the system shown in FIG. 1a. In other words, the predetermined signal sequence may be a pseudorandom signal sequence, e.g., a pseudorandom signal sequence that is generated according to a generation algorithm. In the event of directly transmitting bit-sequences, the pseudorandom signal sequence may be a pseudorandom bit sequence. In the event of higher order modulation schemes, the pseudorandom signal sequence may also be a pseudorandom sequence of symbols. To this end, a signal may, for example, comprise a sequence of symbols, a sequence of bits, or any other.

In contrast to 25G EPON (IEEE 802.3ca), where the complete preamble bit sequence is communicated from the OLT to the ONUs, this disclosure proposes a compressed format by using predetermined sequences, such as pseudorandom sequences for the LDPC training while the sequence for timing recovery/PMD (Physical Media Dependent) settling can be communicated as a short configurable sequence together with the number of repetitions.

Further to a first (sub) section of the preamble for PMD settling and a section of the preamble for LDPC training (e.g., between the first and second section), a third (sub) section can be used for equalizer training. Equalizer training may be selected to be either a repeated pattern as for PMD settling or a predetermined/pseudorandom sequence as for LDPC training.

The proposed examples allow to perform channel measurements necessary to use soft decision FECs and nonlinear equalizers efficiently in upstream transmission of passive optical networks. A concept is proposed to communicate the training data from the OLT to the ONU efficiently.

The proposed concept comprises the generation of a preamble with a first, a second, and an optional third subsection. In various example, the generation of the preamble may be static, e.g., according to a pre-defined standard. In some examples, on the other hand, the generation of the preamble may be parametrized, and based on a preamble configuration message. Accordingly, the preamble generation apparatus may be configured receive the preamble generation message, e.g. from the central unit of the point-to-multipoint network, such as from the OLT of the PON network shown in FIG. 1a. Accordingly, the method may comprise receiving 110 the preamble configuration message, e.g. from the central unit/OLT.

This preamble configuration message may be used to generate the preamble. For example, the preamble configuration message may define parameters for the generation of the preamble, in particular parameters for the predetermined/pseudorandom sequence being used for the second subsection, and optionally for the optional third subsection.

The preamble generation apparatus is configured to generate the first subsection of the preamble, with the first comprising a repetitive signal pattern. In this context, the repetitive signal pattern may comprise an alternating sequence of 1s and 0s (or of signal high and signal low values), such as 10101010 (with N repetitions), which may be suitable for performing clock data recovery, for PMD settling, and/or for coarse a coarse alignment of the equalizer. For example, the repetitive signal pattern may be predefined in the standard, or it may be prescribed by the preamble configuration message. For example, the preamble configuration message may comprise at least one of a length of the repetitive signal pattern, a pattern of the repetitive signal pattern, and a number or repetitions of the repetitive signal pattern. These parameters may be used to generate the first subsection of the preamble. For example, the first subsection may be similar to the preamble being used in legacy PON systems.

In addition to the first subsection, the preamble according to the proposed concept comprises at least one additional subsection, with that subsection comprising a predetermined signal sequence, such as a pseudorandom signal sequence. In the proposed concept, the predetermined sequence may be implemented as pseudorandom signal sequence for at least two reasons—it can be parametrized with few parameters, and it is generally suitable for determining signal statistics to be used as additional knowledge in forward error correction (e.g., using LDPC), and suitable for training a non-linear equalizer. Therefore, the preamble generation apparatus is configured to generate a second subsection of the preamble subsequent to the first subsection, with the second subsection comprising a predetermined signal sequence, which may be a pseudorandom signal sequence. Again, this predetermined signal sequence may be predefined by a standard, or it may be parametrized via the preamble configuration message. For example, the pseudorandom signal sequence may be known at the receiver and the transmitter. While the pseudorandom signal sequence may appear random, it may be generated according to a pre-defined ruleset. For example, the preamble configuration message may comprise at least one of information on an algorithm to be used to generate the preamble, a generator polynomial of the pseudorandom signal sequence/pseudorandom signal sequence, an initialization seed of the pseudorandom signal sequence/pseudorandom signal sequence, a length of the generator polynomial, and the length of the pseudorandom signal sequence/pseudorandom signal sequence. These parameters may be used to define, in a compact manner, the pseudorandom signal sequence/pseudorandom signal sequence, which may reduce the amount of overhead required for instructing the ONUs with respect to the pseudorandom signal sequence.

For example, the pseudorandom signal sequence, and in particular the pseudorandom signal sequence, may be generated based on a generator polynomial and based on an initialization seed, e.g., as defined by the preamble generation message. For example, pseudorandom pattern of the pseudorandom signal sequence can be defined by, e.g., generated based on, the generator polynomial and/or the seed. With an N-bit polynomial, a sequence of 2N−1 bits length can be defined. The seed, the initial setting of the memories of the pseudo-random sequence generator can be communicated in addition, which requires another N bit to be communicated or it can be pre-defined.

As outlined above, according to the proposed concept, the preamble may be generated with two or three subsections. Accordingly, the preamble configuration message may comprise information on a number of subsections of the preamble. For example, the preamble generation apparatus may be configured to generate the preamble with either two or three subsections based on the information on number of subsections of the preamble included in the preamble configuration message.

Accordingly, the preamble generation apparatus may be configured to generate a third subsection of the preamble. The method comprise generating 140 the third subsection of the preamble.

The second and optional third subsection are, in the proposed concept, used for at least one of two purposes—to enable the determination of signal statistics to be used for forward error correction, and/or to train a non-linear equalizer. For example, the second subsection may be used for generating the signal statistics for the forward error correction, and the third subsection may be used for training the non-linear equalizer (or vice versa). Alternatively, a single subsection (i.e., the second subsection) may be used for generating the signal statistics for the forward error correction, and a different (e.g., the third) subsection may be used for training the non-linear equalizer. Further alternatively, the second subsection may be used for either generating the signal statistics for the forward error correction or for training the non-linear equalizer, with the respective other functionality being omitted.

In general, the predetermined signal sequence of the second subsection is suitable for generating the above-referenced signal statistics. To train the non-linear equalizer, either a repetitive signal pattern or a predetermined/pseudorandom signal sequence may be used. Accordingly, the third subsection may comprise a predetermined signal sequence, such as a pseudorandom signal sequence, or a repetitive signal pattern. In both cases, the parameters included in the preamble configuration message for the first or second subsection, may be used to generate the repetitive signal pattern or the predetermined signal pattern, respectively. Alternatively, the preamble configuration message may comprise separate information on one or more of a length of the repetitive signal pattern, a pattern of the repetitive signal pattern, a number or repetitions of the repetitive signal pattern, an algorithm to be used to generate the preamble, a generator polynomial of the predetermined/pseudorandom signal sequence, an initialization seed of the predetermined/pseudorandom signal sequence, a length of the generator polynomial, and the length of the predetermined/pseudorandom signal sequence for the third subsection.

While the subsection is referred to as "third subsection", the third subsection is not necessarily included subsequent to the second subsection. In some examples, the third subsection may be generated (and included in the preamble) subsequent to the second subsection. Alternatively, the third subsection may be generated (and included in the preamble) subsequent to the first subsection and the second subsection may be generated (and included in the preamble) subsequent to the third subsection.

At the end of the respective subsections, a delimiter may be included in the preamble. For example, the preamble generation apparatus may be configured to generate a further predetermined signal sequence serving as a delimiter at the end of at least one of the first subsection, the second subsection and/or the third subsection. Accordingly, the method may comprise generating 150 a further predetermined signal sequence serving as a delimiter at the end of at least one of the first subsection, the second subsection and the third subsection. The preamble generation apparatus may include the respective delimiter(s) in the preamble, e.g., as shown in FIGS. 2b and 2c. For example, the delimiter pattern may be predefined, e.g., as part of a standard being used to communicate in the PON. The delimiter may serve to identify the frame timing even in case that the exact start of the first subsection of the preamble is missed. In one example, each subsection of the preamble ends with a delimiter. In another example, only the first subsection of the preamble has a delimiter, while the end of the second and third subsection is identified with knowledge of the length of the second and third subsection of the preamble and start of the payload data can be derived from that.

After generating the subsection, with the optional delimiter, the preamble may be provided and used as part of an upstream data burst. For example, the preamble generation apparatus may be configured to provide the preamble with at least the first and second subsection (and optionally the third subsection, with the respective optional delimiter(s)). Accordingly, the method may comprise providing 160 the preamble.

For example, the preamble may be provided to a transmitter for the optical network, e.g., to a transmitter component of the ONU. Alternatively, the preamble generation apparatus may be part of a transmitter component of the ONU. Some examples relate to a transmitter for the optical network, such as the ONU or a transmitter component of the ONU comprising the preamble generation apparatus, which is configured to transmit a data burst comprising the preamble. For example, the preamble may be implemented as described with respect to the preamble generation apparatus.

The interface circuitry/means for communicating 12 may correspond to one or more inputs and/or outputs for receiving and/or transmitting information, which may be in digital (bit) values according to a specified code, within a module, between modules or between modules of different entities. For example, the interface circuitry/means for communicating 12 may comprise interface circuitry configured to receive and/or transmit information.

In various examples, the processing circuitry/means for processing 14 may be implemented using one or more processing units, one or more processing devices, any means for processing, such as a processor, a computer or a programmable hardware component being operable with accordingly adapted software. In other words, the described function of the processing circuitry/means for processing 14 may as well be implemented in software, which is then executed on one or more programmable hardware components. Such hardware components may comprise a general-purpose processor, a Digital Signal Processor (DSP), a micro-controller, etc.

In various examples, the memory/storage circuitry/means for storing and retrieving information 16 may comprise at least one element of the group of a computer readable storage medium, such as a magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the preamble generation apparatus, device, method or computer program, and of the PON, ONU or OLT are mentioned in connection with the proposed concept or one or more examples described above or below (e.g. FIGS. 2a to 3b). The preamble generation apparatus, device, method or computer program, and the PON, ONU or OLT may comprise one or more additional optional features corresponding to one or more aspects of the proposed concept or one or more examples described above or below.

In the following, examples of an upstream data burst comprising a preamble are shown. In FIG. 2a, an upstream data burst with a conventional preamble is shown, and in FIGS. 2b and 2b, upstream data bursts with preambles according to the proposed concept are shown.

FIGS. 2a to 2c show examples of data bursts comprising various examples of preambles. FIGS. 2b and 2c shows the proposed new preamble structure, compared to the legacy preamble illustrated in FIG. 2a. The initial part is similar to the preamble used in legacy PON. The first subsection of the preamble is used by the PMD to settle, the first delimiter (D1) is used to find the word alignment.

The proposed concept proposes to add one or two additional subsections (parts) in the preamble. While the first part is built as in the prior arts by a short repeating pattern such as 10101010, the second and the optional third part of the preamble can be pseudo-random sequences that do not have repetitions. Each preamble section may end with a delimiter pattern to simplify detection of the end of each preamble part.

Consequently, as outlined with respect to the preamble generation apparatus of FIG. 1a, the preamble of the data stream, according to the proposed concept, comprises a first subsection 21 with a repetitive signal pattern and a second subsection 23; 25 of the preamble subsequent to the first subsection, with the second subsection comprising a predetermined signal sequence, such as a pseudorandom signal sequence. For example, the data stream may be used for an upstream communication in a passive optical network. In comparison, the "legacy" data burst of FIG. 2a comprises a preamble 200 with a single section 210, with a delimiter 220 at the end of the single section, and with the preamble 200 being followed by the remainder 230 of the PHY burst, e.g., the payload data.

The first part of the preamble can be used to recover the bit timing and have a coarse alignment of the digital equalizers. After detection of the first delimiter, the newly introduced preamble subsections 23; 25 can be used for statistical measurements suitable for LLR calculation or training of nonlinear equalizers. In one example illustrated in FIG. 2b, the LLR calculation statistics and the nonlinear equalizer are trained in parallel on the same data and a preamble 20a of two subsections is used. In another example also illustrated by means of FIG. 2b, there is only a soft input FEC, but no non-linear equalization or just non-linear equalization but no soft input FEC and only two preamble subsections are used. In other words, the preamble 20b may consist of the first 21 and second 23 subsection, with corresponding delimiters 22; 24. In another example illustrated in FIG. 2c, the LDPC and nonlinear equalizer are trained in sequence and three preamble subsections are required. In other words, the preamble may comprise three subsections 21; 23; 25, with three optional delimiters 22; 24; 26. The preamble is followed by the remainder 27 of the PHY burst.

As shown in FIGS. 2b and 2c, the proposed preamble structure consists of, or comprises, two or three parts/ subsections 21; 23; 25 The first one 21, which may correspond to the first subsection, may comprise a repetitive signal pattern, which may be defined by a pattern of a fixed number of bits, e.g., 1-8 bits that is repeated N times. The second, optional part 23 (which may correspond to the third subsection) may use the structure of the first or the last part. In other words, the third subsection may comprise a predetermined signal sequence, such as a pseudorandom signal sequence, or a repetitive signal pattern. The third part 25 contains a predetermined (e.g., pseudorandom) pattern that is used to derive signal statistics. It is communicated e.g., in terms of a generator polynomial and the length of the sequence. In some examples, as shown in FIG. 2c, the third subsection 23 may be arranged subsequent to the first subsection 21 and the second subsection 25 may be arranged subsequent to the third subsection 23. Alternatively, the third subsection may follow the first and second subsections. In other words, the third subsection 25 may be arranged subsequent to the second subsection 23.

The second and the third parts may also be exchanged with one another so that the second part/subsection contains a predetermined (e.g., pseudorandom) pattern that is used to derive signal statistics while the optional third part/subsection uses either the structure of the first or the last part/ subsection. In any event, the part/subsection that contains a predetermined (e.g., pseudorandom) pattern that is used to derive signal statistics is subsequent the first part/subsection, either directly following the first part/subsection or with another subsection in between.

At the end of the first part/subsection of the preamble, there is a delimiter pattern that is predefined. This may serve to identify the frame timing even in case that the exact start of the first part of the preamble is missed. In one example, each part of the preamble ends with a delimiter. In another example, only the first part of the preamble has a delimiter, while the end of the second and third part is identified with knowledge of the length of the second and third part of the preamble and start of the payload data can be derived from that. In other words, the data stream comprises a further predetermined signal sequence serving as a delimiter 22; 24; 26 at the end of at least one of the first, second and third subsection.

More details and aspects of the data stream and preamble are mentioned in connection with the proposed concept or one or more examples described above or below (e.g. FIG. 1a to 1b, 3a to 3b. The data stream or preamble may comprise one or more additional optional features corresponding to one or more aspects of the proposed concept or one or more examples described above or below.

Figure 3A:
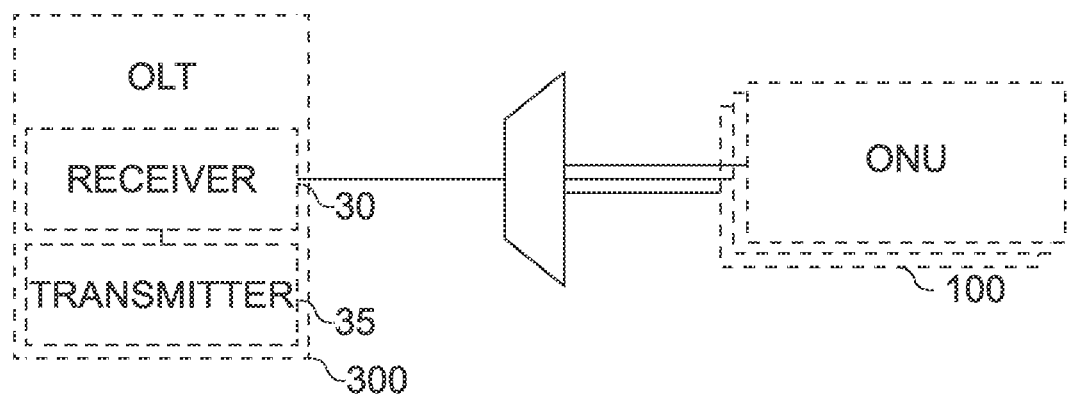
FIG. 3a shows a block diagram of an example of a receiver and of a transmitter, and of an optical line terminal comprising at least one of the receiver and the transmitter.

FIG. 3a shows a block diagram of an example of a receiver 30 or receiver device 30 and of a (network) transmitter 35 or (network) transmitter device 35 for an optical network, and of an optical line terminal (OLT) or central unit 300 comprising at least one of the receiver (device) 30 and the transmitter (device) 35. The components of the receiver device 30 are defined as component means, which correspond to the respective structural components of the receiver 30. Similarly, the components of the transmitter device 35 are defined as component means, which correspond to the respective structural components of the transmitter 35. Both the receiver 30 and the transmitter 35 may comprise circuitry, such as interface circuitry, processing circuitry and/or memory circuitry, which may be configured to provide the functionality of the respective receiver or transmitter. The corresponding receiver device and transmitter device may comprise corresponding means for communicating, means for processing and/or means for storing and/or receiving information, which may be configured to provide the functionality of the respective receiver or transmitter. For example, the processing circuitry/means for processing circuitry may be configured to provide the functionality of the respective receiver or transmitter, with the help of the interface circuitry/means for communicating (for transmitting or receiving information) and/or the memory/storage circuitry/means for storing and retrieving information (for storing information). In the following, if the receiver or transmitter is configured to perform an action, the respective action may be performed by the respective circuitry of means of the respective receiver or transmitter, or by the corresponding method or computer program.

In the following, the concept is illustrated with respect to the receiver 30 and transmitter 35. Features introduced with respect to the receiver 30 and transmitter 35 may likewise be introduced in the corresponding receiver device 30 and transmitter device 35.

In some examples, the transmitter 35 and receiver 30 may at least partially share circuitry. For example, the transmitter and receiver may share a transceiver circuitry, which may be used as interface of the respective components. Furthermore, the receiver and transmitter may share processing circuitry and/or memory/storage circuitry. Alternatively, the circuitry of the transmitter 35 and receiver 30 may be separate.

In general, the receiver 30 and the transmitter 35 may be part of the same device, e.g., of the same OLT. Therefore, the functionality of the receiver 30 and the transmitter are introduced together.

The receiver/transmitter and/or OLT of FIG. 3a is the counterpart to the preamble generation apparatus/device and ONU of FIG. 1a—on the one hand, the receiver 30 receives a data burst with the preamble, as generated by the preamble generation apparatus 10 of FIG. 1a. On the other hand, the preamble being received by the receiver may be based on a preamble configuration message provided by the transmitter 35.

Therefore, the (network) transmitter 35 is configured to transmit a preamble configuration message to a network unit, e.g., the optical networking unit 100 of FIG. 1a, of an optical network. The preamble configuration message comprises information on an algorithm to be used to generate a predetermined signal sequence, such as a pseudorandom signal sequence, of a subsection of the preamble and information on a length of the predetermined signal sequence.

The receiver 30 is configured to receive a data burst comprising a preamble. The preamble comprises a first subsection comprising a repetitive signal pattern. The preamble further comprises a second subsection of the preamble subsequent to the first subsection. The secand subsection comprises a predetermined signal sequence, such as a pseudorandom signal sequence. The receiver 30 is configured to determine information for an error correction code or information for a non-linear equalizer using the predetermined signal sequence of the preamble.

FIG. 3a further shows an OLT 300 comprising at least one of the receiver (device) 30 and the transmitter (device) 35. FIG. 3a further shows a system comprising at least one of the receiver (device) 30 and the transmitter (device) 35 and the preamble generation apparatus/device 10. FIG. 3a further shows a system comprising the OLT 300 (with the receiver (device) 30 and/or the transmitter (device) 35 and one or more ONU 100.

Figure 3B:
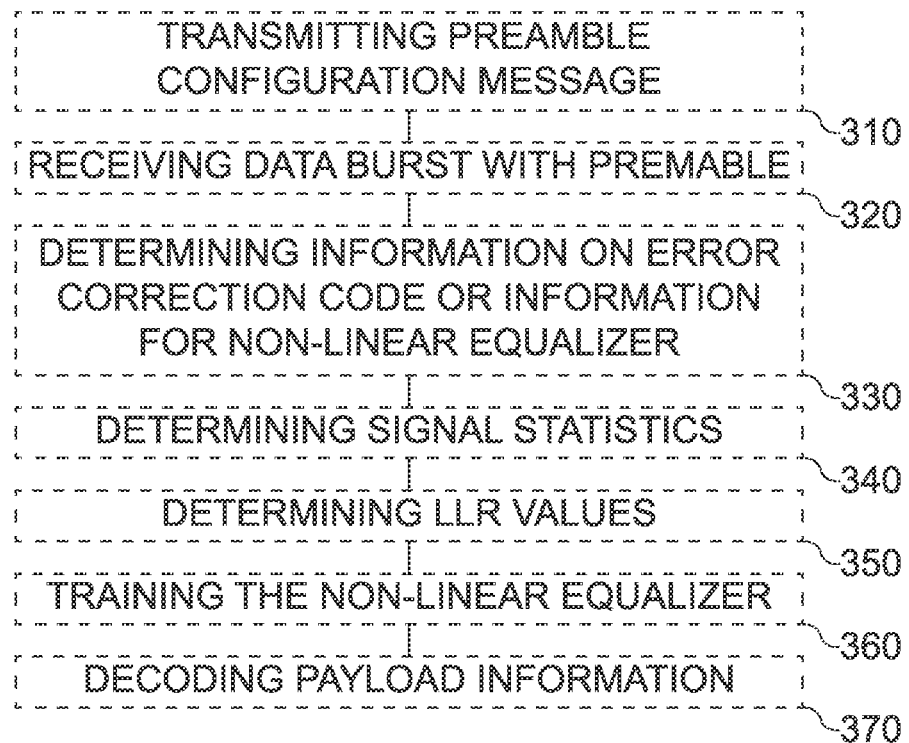
FIG. 3b shows a flow chart of an example of a method for a transceiver and/or for a receiver.

FIG. 3b shows a flow chart of an example of corresponding methods for the transmitter (device) 35 and/or for the receiver (device) 30. The (network) transmitter method comprises transmitting the preamble configuration message to a network unit of an optical network. The receiver method comprises receiving 320 a data burst comprising the preamble. The receiver method comprises determining 330 information for an error correction code or information for a non-linear equalizer using the predetermined signal sequence of the preamble.

The following description relates to the receiver (device) 30, the transmitter (device) 35, to the corresponding receiver method and network transmitter method, and to corresponding computer programs. Features introduced with respect to the receiver 30 and transmitter 35 may likewise be introduced in the corresponding devices, methods and computer program (and vice versa).

As outlined above, the receiver 30 and transmitter 35 serve as counterparts for the preamble generation apparatus 10 of FIG. 1a—by, at the transmitter, providing the preamble configuration message, and by, at the receiver, evaluating the preamble with respect to forward error correction and/or non-linear equalization.

First, the receiver 30 is introduced in more detail. The receiver 30 is configured to receive a data burst with a preamble, e.g. from an optical networking unit of a passive optical network, such as the ONU 100 shown in FIGS. 1a and 3a. As outlined in connection with FIGS. 1a to 2b, the preamble comprises two or three subsections—a first subsection that is being used for clock data recovery and (coarse) equalization, a second subsection that is used for determining signal statistics for use with the forward error correction, and/or for training the non-linear equalizer, and an optional third subsection for training the non-linear equalizer (if the second sub-section is not used for both training the non-linear equalizer and for determining the signal statistics). In other words, the receiver is configured to determine the information for the error correction code (i.e., the signal statistics) and/or information for a non-linear equalizer (i.e., information suitable for training the non-linear equalizer) using the predetermined signal sequence (e.g., the pseudorandom signal sequence) of the preamble.

For example, the receiver may be configured to determine signal statistics to be used for soft-decision forward error correction using the predetermined signal sequence (e.g., the pseudorandom signal sequence) of the preamble. Accordingly, the receiver method may comprise determining 340 signal statistics to be used for soft-decision forward error correction using the predetermined signal sequence of the preamble. Accordingly, the information for the error correction code may comprise signal statistics. In particular, the proposed concept uses the preamble for FEC-related measurements, e.g., to derive signal statistics for the FEC input signal. Soft decision FECs like LDPC use log likelihood ratios (LLR) as an input. To improve the accuracy of the LLR calculation for upstream bursts in PON networks, the upstream preamble may be designed accordingly. The proposed preamble structure can be used to train nonlinear equalizers, too.

The LLR values may be calculated, based on the receive signal and knowledge of the receive signal statistics, e.g., the channel quality. In other words, the receiver may be configured to determine Log-Likelihood Ratio values representing the payload data of the data burst based on signal statistics included in the information for the error correction code. Accordingly, the receiver method may comprise determining 350 the Log-Likelihood Ratio values. For example, by determining the signal statistics, such as the signal response over the channel between the ONU and the OLT, the portion of the data burst representing the payload data can be better transformed into LLR values.

In general, a binary signal can be seen as a sequence of ones and zeros. For example, the receive signal, which is the signal representing the data burst, as received by the receiver, can be a binary receive signal consisting of ones and zeros. Such a binary receive signal is useful in scenarios, where the ones and zero can (almost) always be received perfectly. Furthermore, such binary receiver signals are sufficient for hard-decision decoding-based forward error correction processing, such as hard-decision LDPC.

Soft-decision decoding-based FEC-concepts, on the other hand, benefit from additional information on the receive signal. In particular, as outlined above, instead of using binary values at the input, the soft-decision based FEC-concepts, such as soft-decision LDPC, use LLR values as inputs. These LLR values can be generated based on the output of an analog-to-digital converter quantizing the receive signal, where the output is non-binary, i.e., where the output represents one or more additional signal levels in addition to the signal high (ones) or signal low (zero) signal levels. Accordingly, the receive signal may be the output of an analog-to-digital converter with M>1 bits resolution.

The signal statistics may now be used as an additional function for mapping the output of the analog-to-digital converter to LLR values, e.g., by determining the LLR values based on the signal statistics, e.g., based on the error rate on the channel between the ONU and the OLT. Accordingly, the receiver may be configured to determine a probability of a bit error in upstream transmissions over the channel between the ONU and the OLT based on the predetermined signal sequence, e.g., by comparing the predetermined signal sequence, as contained in the preamble and received by the receiver, with the predetermined signal sequence, as defined by the preamble configuration message. For example, the pseudorandom signal sequence may be known at the receiver and the transmitter.

The receive signal statistics are estimated at the receiver, based on a known transmit sequence (i.e., the predetermined signal sequence). In other words, the predetermined signal sequence, and in particular the pseudorandom signal sequence may appear random. It is, however, generated based on one or more parameters, such as the generator polynomial and the initialization seed, and thus known at both the receiver and the entity transmitting the data burst (i.e., the ONU). Especially in upstream direction, where different transmission bursts from different ONUs are received, the time to derive the signal statistics is limited.

For example, the signal statistics may consist of or comprise the probabilities of a bit error, e.g., the probability that a 1 is transmitted and a 0 is received as well as the probability that a 0 is transmitted and a 1 is received. In other words, the receiver may be configured to determine the bit error, e.g., the probability that a 1 is transmitted and a 0 is received as well as the probability that a 0 is transmitted and a 1 is received. As the LLR values represent the likelihood that a specific bit is a 0 or 1, the probability of the bit error may be used to determine the LLR values, e.g., by limiting the likelihood that the bit is one or zero based on the probability of the respective bit error.

In another example, the receive bits before and/or after the currently received bit are taken into account when measuring the probability of a 1 transmitted flipping to a 0 or vice versa. In other words, the receiver may be configured to determine the probability that a 1 is transmitted and a 0 is received as well as the probability that a 0 is transmitted and a 1 is received while taking into account the receive bits before and/or after the currently received bit. In another example, the receive signal amplitudes of the receive symbols before and/or after the currently received bit are taken into account when deriving the signal statistics.

In another example, the signal statistics may comprise or consist of the probability distribution of the ADC amplitude levels for a 1 transmitted and the probability distribution of the ADC amplitude levels for a 0 transmitted. In other words, the receiver may be configured to determine the probability distribution of the ADC amplitude levels for a 1 transmitted and the probability distribution of the ADC amplitude levels for a 0 transmitted. In this case, the LLR values may be determined from the ADC amplitude values, with the likelihood value being assigned being based on the probability distribution of the ADC amplitude levels for a 1 transmitted and the probability distribution of the ADC amplitude levels for a 0 transmitted.

For the LLR calculation only the channel specific bit errors (e.g., bit error rate) might be considered, as any impact of the bit errors caused by PMD settling effects has a negative impact on the LLR calculation and thus the performance of the LDPC decoder. In other words, the receiver may be configured to disregard PMD settling effects in the determination of the signal statistics.

There are two differences of the preamble used for the PMD and the LLR calculation of the LDPC. The preamble dedicated to PMD operations is consumed in the bit-serial domain of a burst mode receiver while the LLR calculation is done in the word-aligned domain. In other words, the second and/or the third subsection of the preamble may be processed in the word-aligned domain. A preamble optimized for the PMD settling requires a different pattern than a preamble optimized for fast convergence of the LLR calculation in a given environment like PON burst mode upstream reception.

In general, the receiver may be further configured to decode the payload data within the data burst. Accordingly, the method may comprise decoding 370 the payload data. For example, the payload data may be decoded using a soft decision error correction decoder, such as a soft-decision LDPC decoder, or using a hard decision error correction decoder, such as a hard-decision LDPC decoder. For example, the soft decision error correction decoder may be based on a LDPC code. Similarly, the hard decision correction decoder may be based on a LDPC code. As outlined above, the receiver may be configured to decode the payload information based on signal statistics included in the information for the error correction code, e.g., by generating the LLR values for the soft decision decoding based on the signal statistics.

In some examples, the receiver may have adaptive digital equalizers which do not converge well with the preamble pattern of the first subsection that is being used for PLL convergence. For example, the predetermined signal sequence of the second subsection, or a pseudorandom signal sequence or repetitive pattern of the third subsequence, may be used to train the adaptive digital (non-linear) equalizer of the receiver. In other words, the receiver may be configured to train the non-linear equalizer using the predetermined/pseudo-random signal sequence, and to use the trained non-linear equalizer for the data burst. Accordingly, the receiver method may comprise training 360 the non-linear equalizer using the predetermined/pseudo-random signal sequence, and using the trained non-linear equalizer for the data burst.

In this context, the "training" of the non-linear equalizer may refer to a training of a machine-learning-based implementation of the non-linear equalizer. For example, the nonlinear equalizer may be implemented using an artificial neural network, and the second or third subsection of the preamble may be used to adjust the weights of the artificial neural network, e.g., by using the respective subsection, as received by the receiver, as input to the artificial neural network, and using a suitably equalized version of the respective subsection, as defined by the preamble configuration message, as desired output of the artificial neural network, and applying supervised learning to train the artificial neural network to transform the respective subsection, as received by the receiver into the respective subsection, as defined by the preamble configuration message.

As outlined above, the transmitter transmits the preamble configuration message to the ONU (as already described in connection with FIGS. 1*a* to 1*b*). In some examples, the receiver may be a transceiver, and may comprise functionality to transmit the preamble configuration message instead of the separate transmitter. In other words, the receiver may be configured to transmit the preamble configuration message to the optical networking unit, wherein the received data burst is based on the preamble configuration message. Accordingly, the receiver method may comprise transmitting 310 the preamble configuration message to the optical networking unit. In any case, i.e., regardless of whether the preamble configuration message is transmitted by the transmitter or by the receiver, the received data burst may be based on the preamble configuration message.

In general, an OLT communicates with a plurality of ONUs. Between each ONU and the OLT, a separate transmission path exists, with different channel properties. Therefore, the proposed concept may be applied to a plurality of ONUs, with the procedure being performed separately for each ONU. For example, the receiver may be configured to receive a plurality of data bursts from one or more optical networking units of a passive optical network, and to determine the information for the error correction code or the information for a non-linear equalizer separately for each optical networking unit or separately for each data burst. For example, the receiver may be configured to receive the plurality of data bursts from a plurality of optical networking units. In some examples, the transmitter or the receiver may be configured to transmit separate preamble configuration messages to the plurality of optical networking units. For example, in a PON, the OLT may configure the preamble by an overhead channel message (i.e., the preamble configuration message) from the OLT to the individual ONUs. Each ONU can be configured differently. The configuration message is transmitted to each ONU individually and thus, can cause significant overhead in the downstream transmission. Thus, it is helpful to have an efficient protocol to exchange the preamble configuration between OLT and ONUs.

As outlined in connection with FIGS. 1*a* to 1*b*, the preamble configuration message may comprise various parameters defining the preamble. For example, the preamble configuration message may comprise information on one or more of a number of subsections of the preamble, a length of the repetitive signal pattern, a pattern of the repetitive signal pattern, a number or repetitions of the repetitive signal pattern, an algorithm to be used to generate the preamble, a generator polynomial of the predetermined signal sequence (e.g., of the pseudorandom signal sequence), an initialization seed of the predetermined signal sequence (e.g., of the pseudorandom signal sequence), a length of the generator polynomial, and the length of the predetermined signal sequence (e.g., of the pseudorandom signal sequence).

For example, the preamble configuration message may communicate the number of sections in the preamble, e.g. two or three subsections. For each preamble section, it may contain the type (repeating pattern or pseudorandom). In other words, the preamble configuration message may comprise information on a number of subsections of the preamble, and information on a signal pattern being used for the respective subsection.

For the repeating (i.e., repetitive) pattern, the preamble configuration message (i.e. the configuration) may comprise any of the length of the repeating pattern, the pattern itself, or the number of repetitions. In other words, the preamble configuration message may comprise information on a length of the repetitive signal pattern, a pattern of the repetitive signal pattern, and/or a number or repetitions of the repetitive signal pattern.

For the predetermined signal sequence, e.g., the pseudorandom pattern, the preamble configuration message may comprise the generator polynomial of the pattern (can be communicated or fixed) and/or an initialization seed (can be communicated or fixed). The configuration may further comprise the length of the polynomial (can be communicated or fixed in the standard) and/or the length of the related preamble part/subsection. In other words, the preamble configuration message may comprise information on an algorithm to be used to generate the preamble, a generator polynomial of the pseudorandom signal sequence, an initialization seed of the pseudorandom signal sequence, a length of the generator polynomial, and/or the length of the pseudorandom signal sequence.

For the structure of the preamble required for LLR calculation or a non-linear equalizer, a pseudorandom sequence is a very efficient method to communicate the pattern. The pseudorandom pattern can be defined by a generator polynomial and a seed. With an N-bit polynomial, a sequence of 2N–1 bits length can be defined. The seed, the initial setting of the memories of the pseudo-random sequence generator can be communicated in addition, which requires another N bit to be communicated or it can be pre-defined.

Conventional PON systems up to 10 Gbit/s use hard decision FECs and thus may not require knowledge of the signal statistics. The preamble in upstream direction is used to lock symbol timing and to train digital and analog equalizers and adjust the decision thresholds for the hard decision receiver. For this case, it is convenient to use a simple pattern like 10101010. Hereby, conventional 10G PON allows the configuration of the preamble pattern by a bit pattern of e.g., 64 bit and the number of repetitions of the bit pattern. For 25G PON, e.g., IEEE 802.3ca, where an LDPC is used for forward error correction, the complete preamble pattern, consisting of 3 different 257-bit patterns, may be communicated to the transmitter, which results in a lot of overhead communication.

More details and aspects of the OLT, the receiver (device), the (network) transmitter (device), and of the corresponding methods and computer programs are mentioned in connection with the proposed concept or one or more examples described above or below (e.g. FIG. 1a to 2c). The OLT, the receiver (device), the (network) transmitter (device), and the corresponding methods and computer programs may comprise one or more additional optional features corresponding to one or more aspects of the proposed concept or one or more examples described above or below.

The aspects and features described in relation to a particular one of the previous examples may also be combined with one or more of the further examples to replace an identical or similar feature of that further example or to additionally introduce the features into the further example.

An example (e.g., example 1) relates to a preamble generation apparatus (10) for generating a preamble for a communication over an optical network, the preamble generation apparatus comprising circuitry configured to generate a first subsection of the preamble, the first subsection of the preamble comprising a repetitive signal pattern. The circuitry is configured to generate a second subsection of the preamble subsequent to the first subsection, the second subsection comprising a predetermined signal sequence.

Another example (e.g., example 1a), relates to a previously described example (e.g., example 1) or to any of the examples described herein, further comprising that the predetermined signal sequence is a pseudorandom signal sequence that is generated according to a generation algorithm.

Another example (e.g., example 2) relates to a previously described example (e.g., example 1 or 1a) or to any of the examples described herein, further comprising that the preamble generation apparatus is configured to generate a further predetermined signal sequence serving as a delimiter at the end of the first subsection.

Another example (e.g., example 3) relates to a previously described example (e.g., one of the examples 1 to 2) or to any of the examples described herein, further comprising that the preamble generation apparatus is configured to generate a further predetermined signal sequence serving as a delimiter at the end of the second subsection.

Another example (e.g., example 4) relates to a previously described example (e.g., one of the examples 1 to 3) or to any of the examples described herein, further comprising that the preamble generation apparatus is configured to generate a third subsection of the preamble.

Another example (e.g., example 5) relates to a previously described example (e.g., example 4) or to any of the examples described herein, further comprising that the third subsection is generated subsequent to the second subsection.

Another example (e.g., example 6) relates to a previously described example (e.g., example 4) or to any of the examples described herein, further comprising that the third subsection is generated subsequent to the first subsection and the second subsection is generated subsequent to the third subsection.

An example (e.g., example 7) relates to a previously described example (e.g., one of the examples 4 to 6) or to any of the examples described herein, further comprising that the third subsection comprises a predetermined signal sequence, such as a pseudorandom signal sequence.

Another example (e.g., example 8) relates to a previously described example (e.g., one of the examples 4 to 6) or to any of the examples described herein, further comprising that the third subsection comprises a repetitive signal pattern.

Another example (e.g., example 9) relates to a previously described example (e.g., one of the examples 4 to 8) or to any of the examples described herein, further comprising that the preamble generation apparatus is configured to generate a further predetermined signal sequence serving as a delimiter at the end of the third subsection.

Another example (e.g., example 10) relates to a previously described example (e.g., one of the examples 1 to 9) or to any of the examples described herein, further comprising that the preamble is generated for an upstream communication in a passive optical network.

Another example (e.g., example 11) relates to a previously described example (e.g., one of the examples 1 to 10) or to any of the examples described herein, further comprising that the preamble generation apparatus is configured to provide the preamble with at least the first and second subsection.

Another example (e.g., example 12) relates to a previously described example (e.g., one of the examples 1 to 11) or to any of the examples described herein, further comprising that the predetermined signal sequence is generated based on a generator polynomial.

Another example (e.g., example 13) relates to a previously described example (e.g., one of the examples 1 to 11) or to any of the examples described herein, further comprising that the predetermined signal sequence is generated based on an initialization seed.

Another example (e.g., example 14) relates to a previously described example (e.g., one of the examples 1 to 13) or to any of the examples described herein, further comprising that the preamble generation apparatus is configured to receive a preamble configuration message, wherein the preamble is generated based on the preamble configuration message.

Another example (e.g., example 15) relates to a previously described example (e.g., example 14) or to any of the examples described herein, further comprising that the preamble configuration message comprises information on one or more of a number of subsections of the preamble, a length of the repetitive signal pattern, a pattern of the repetitive signal pattern, a number or repetitions of the repetitive signal pattern, information on an algorithm to be used to generate the preamble, a generator polynomial of the predetermined signal sequence (e.g., of a pseudorandom signal sequence corresponding to the predetermined signal sequence), an initialization seed of the predetermined signal sequence (e.g., of a pseudorandom signal sequence corresponding to the predetermined signal sequence), a length of the generator polynomial, and the length of the predetermined signal sequence (e.g., of a pseudorandom signal sequence corresponding to the predetermined signal sequence).

An example (e.g., example 16) relates to a preamble generation device (10) for generating a preamble for a communication over an optical network, the preamble generation device comprising means for processing configured to generate a first subsection of the preamble, the first subsection of the preamble comprising a repetitive signal pattern. The means for processing is configured to generate a second subsection of the preamble subsequent to the first subsection, the second subsection comprising a predetermined signal sequence.

An example (e.g., example 17) relates to an optical networking unit (100) for a passive optical network, the optical networking unit comprising the preamble generation apparatus (10) or preamble generation device (10) according to one of the examples 1 to 16.

An example (e.g., example 18) relates to a method for generating a preamble for a communication over an optical network, the method comprising generating (120) a first subsection of the preamble, the first subsection of the preamble comprising a repetitive signal pattern. The method comprises generating (130) a second subsection of the preamble subsequent to the first subsection, the second subsection comprising a predetermined signal sequence, such as a pseudorandom signal sequence that is generated according to a generation algorithm.

Another example (e.g., example 19) relates to a previously described example (e.g., example 18) or to any of the examples described herein, further comprising that the method comprises generating a further predetermined signal sequence (150) serving as a delimiter at the end of the first subsection.

Another example (e.g., example 20) relates to a previously described example (e.g., one of the examples 18 to 19) or to any of the examples described herein, further comprising that the method comprises generating (150) a further predetermined signal sequence serving as a delimiter at the end of the second subsection.

Another example (e.g., example 21) relates to a previously described example (e.g., one of the examples 18 to 20) or to any of the examples described herein, further comprising that the method comprises generating (140) a third subsection of the preamble.

Another example (e.g., example 22) relates to a previously described example (e.g., example 21) or to any of the examples described herein, further comprising that the third subsection is generated subsequent to the second subsection.

Another example (e.g., example 23) relates to a previously described example (e.g., example 21) or to any of the examples described herein, further comprising that the third subsection is generated subsequent to the first subsection and the second subsection is generated subsequent to the third subsection.

An example (e.g., example 24) relates to a previously described example (e.g., one of the examples 19 to 23), wherein the third subsection comprises a predetermined signal sequence, such as a pseudorandom signal sequence.

Another example (e.g., example 25) relates to a previously described example (e.g., one of the examples 19 to 23) or to any of the examples described herein, further comprising that the third subsection comprises a repetitive signal pattern.

Another example (e.g., example 26) relates to a previously described example (e.g., one of the examples 19 to 25) or to any of the examples described herein, further comprising that the method comprises generating (150) a further predetermined signal sequence serving as a delimiter at the end of the third subsection.

Another example (e.g., example 27) relates to a previously described example (e.g., one of the examples 18 to 26) or to any of the examples described herein, further comprising that the preamble is generated for an upstream communication in a passive optical network.

Another example (e.g., example 28) relates to a previously described example (e.g., one of the examples 18 to 27) or to any of the examples described herein, further comprising that the method comprises providing (160) the preamble with at least the first and second subsection.

Another example (e.g., example 29) relates to a previously described example (e.g., one of the examples 18 to 28) or to any of the examples described herein, further comprising that the predetermined signal sequence is generated based on a generator polynomial.

Another example (e.g., example 30) relates to a previously described example (e.g., one of the examples 18 to 28) or to any of the examples described herein, further comprising that the predetermined signal sequence is generated based on an initialization seed.

Another example (e.g., example 31) relates to a previously described example (e.g., one of the examples 18 to 30)

or to any of the examples described herein, further comprising that the method comprises receiving (110) a preamble configuration message, wherein the preamble is generated based on the preamble configuration message.

Another example (e.g., example 32) relates to a previously described example (e.g., example 29) or to any of the examples described herein, further comprising that the preamble configuration message comprises information on one or more of a number of subsections of the preamble, a length of the repetitive signal pattern, a pattern of the repetitive signal pattern, a number or repetitions of the repetitive signal pattern, information on an algorithm to be used to generate the preamble, a generator polynomial of the predetermined signal sequence (e.g., of a pseudorandom signal sequence corresponding to the predetermined signal sequence), an initialization seed of the predetermined signal sequence (e.g., of a pseudorandom signal sequence corresponding to the predetermined signal sequence), a length of the generator polynomial, and the length of the predetermined signal sequence (e.g., of a pseudorandom signal sequence corresponding to the predetermined signal sequence).

An example (e.g., example 33) relates to a data stream for transmission over an optical network, comprising a preamble (20a; 20b) having a first subsection (21) comprising a repetitive signal pattern. The data stream comprises a second subsection (23; 25) of the preamble subsequent to the first subsection, the second subsection comprising a predetermined signal sequence, such as a pseudorandom signal sequence that is generated according to a generation algorithm.

Another example (e.g., example 34) relates to a previously described example (e.g., example 33) or to any of the examples described herein, further comprising that the data stream comprises a further predetermined signal sequence serving as a delimiter (22) at the end of the first subsection.

Another example (e.g., example 35) relates to a previously described example (e.g., one of the examples 33 to 34) or to any of the examples described herein, further comprising that the data stream comprises a further predetermined signal sequence serving as a delimiter (24; 26) at the end of the second subsection.

Another example (e.g., example 36) relates to a previously described example (e.g., one of the examples 33 to 35) or to any of the examples described herein, further comprising that the data stream comprises a third subsection (23; 25).

Another example (e.g., example 37) relates to a previously described example (e.g., example 36) or to any of the examples described herein, further comprising that the third subsection (25) is arranged subsequent to the second subsection (23).

Another example (e.g., example 38) relates to a previously described example (e.g., example 36) or to any of the examples described herein, further comprising that the third subsection (23) is arranged subsequent to the first subsection (21) and the second subsection (25) is arranged subsequent to the third subsection (23).

Another example (e.g., example 39) relates to a previously described example (e.g., one of the examples 36 to 38) or to any of the examples described herein, further comprising that the third subsection comprises a predetermined signal sequence, such as a pseudorandom signal sequence that is generated according to a generation algorithm.

Another example (e.g., example 40) relates to a previously described example (e.g., one of the examples 36 to 39) or to any of the examples described herein, further comprising that the third subsection comprises a repetitive signal pattern.

Another example (e.g., example 41) relates to a previously described example (e.g., one of the examples 36 to 40) or to any of the examples described herein, further comprising that the data stream comprises a further predetermined signal sequence serving as a delimiter (24; 26) at the end of the third subsection.

Another example (e.g., example 42) relates to a previously described example (e.g., one of the examples 33 to 39) or to any of the examples described herein, further comprising that the data stream is used for an upstream communication in a passive optical network.

An example (e.g., example 43) relates to a receiver (30) for an optical network configured to receive a data burst comprising a preamble, the preamble comprising a first subsection comprising a repetitive signal pattern, and a second subsection of the preamble subsequent to the first subsection, the second subsection comprising a predetermined signal sequence, such as a pseudorandom signal sequence that is generated according to a generation algorithm. The receiver (30) is configured to determine information for an error correction code or information for a non-linear equalizer using the predetermined signal sequence of the preamble.

Another example (e.g., example 44) relates to a previously described example (e.g., example 43) or to any of the examples described herein, further comprising that the receiver is configured to determine signal statistics to be used for soft-decision forward error correction using the predetermined signal sequence of the preamble.

Another example (e.g., example 45) relates to a previously described example (e.g., one of the examples 43 to 44) or to any of the examples described herein, further comprising that the information for the error correction code comprises signal statistics.

Another example (e.g., example 46) relates to a previously described example (e.g., one of the examples 43 to 45) or to any of the examples described herein, further comprising that the receiver is configured to decode payload data within the data burst using a soft decision error correction decoder.

Another example (e.g., example 47) relates to a previously described example (e.g., example 46) or to any of the examples described herein, further comprising that the receiver is configured to decode the payload information based on signal statistics included in the information for the error correction code.

Another example (e.g., example 48) relates to a previously described example (e.g., one of the examples 46 to 47) or to any of the examples described herein, further comprising that the receiver is configured to determine Log-Likelihood Ratio values representing the payload data based on signal statistics included in the information for the error correction code.

Another example (e.g., example 49) relates to a previously described example (e.g., one of the examples 46 to 48) or to any of the examples described herein, further comprising that the soft decision error correction decoder is based on a LDPC code.

Another example (e.g., example 50) relates to a previously described example (e.g., one of the examples 43 to 49) or to any of the examples described herein, further comprising that the receiver is configured to train the non-linear equalizer using the predetermined signal sequence (e.g., the pseudorandom signal sequence), and to use the trained non-linear equaliter for the data burst.

Another example (e.g., example 51) relates to a previously described example (e.g., one of the examples 43 to 50) or to any of the examples described herein, further comprising that the preamble comprises a third subsection.

Another example (e.g., example 52) relates to a previously described example (e.g., example 51) or to any of the examples described herein, further comprising that the receiver is configured to determine the information for the error correction code using the predetermined signal sequence of the preamble and to determine the information for the non-linear equalizer using the third subsection of the preamble.

Another example (e.g., example 53) relates to a previously described example (e.g., one of the examples 51 to 52) or to any of the examples described herein, further comprising that the third subsection comprises a predetermined signal sequence, such as a pseudorandom signal sequence that is generated according to a generation algorithm.

Another example (e.g., example 54) relates to a previously described example (e.g., one of the examples 43 to 53) or to any of the examples described herein, further comprising that the receiver is configured to receive the data burst from an optical networking unit of a passive optical network.

Another example (e.g., example 55) relates to a previously described example (e.g., example 54) or to any of the examples described herein, further comprising that the receiver is configured to transmit a preamble configuration message to the optical networking unit, wherein the received data burst is based on the preamble configuration message.

Another example (e.g., example 56) relates to a previously described example (e.g., one of the examples 43 to 55) or to any of the examples described herein, further comprising that the receiver is configured to receive a plurality of data bursts from one or more optical networking units of a passive optical network, and to determine the information for the error correction code or the information for a non-linear equalizer separately for each optical networking unit or separately for each data burst.

Another example (e.g., example 57) relates to a previously described example (e.g., example 56) or to any of the examples described herein, further comprising that the receiver is configured to receive the plurality of data bursts from a plurality of optical networking units, and to transmit separate preamble configuration messages to the plurality of optical networking units.

An example (e.g., example 58) relates to a receiver device (30) for an optical network, the receiver device comprising means for processing configured to receive a data burst comprising a preamble, the preamble comprising a first subsection comprising a repetitive signal pattern, and a second subsection of the preamble subsequent to the first subsection, the secand subsection comprising a predetermined signal sequence, such as a pseudorandom signal sequence that is generated according to a generation algorithm. The means for processing is configured to determine information for an error correction code or information for a non-linear equalizer using the predetermined signal sequence of the preamble.

An example (e.g., example 59) relates to an Optical Line Terminal (300) for a Passive Optical Network comprising the receiver or receiver device according to one of the examples 43 to 58.

An example (e.g., example 60) relates to a system comprising the Optical Line Terminal (300) according to example 59 and one or more Optical Networking Units (100) according to example 17.

An example (e.g., example 61) relates to a system comprising a receiver (30) or receiver device (30) according to one of the examples 43 to 58 and a preamble generation apparatus (10) or preamble generation device (10) according to one of the examples 1 to 16.

An example (e.g., example 62) relates to a receiver method for an optical network, comprising receiving (320) a data burst comprising a preamble, the preamble comprising a first subsection comprising a repetitive signal pattern, and a second subsection of the preamble sub-sequent to the first subsection, the second subsection comprising a predetermined signal sequence, such as a pseudorandom signal sequence that is generated according to a generation algorithm. The receiver method comprises determining (330) information for an error correction code or information for a non-linear equalizer using the predetermined signal sequence of the preamble.

Another example (e.g., example 63) relates to a previously described example (e.g., example 62) or to any of the examples described herein, further comprising that the receiver method comprises determining (340) signal statistics to be used for soft-decision forward error correction using the predetermined signal sequence of the preamble.

Another example (e.g., example 64) relates to a previously described example (e.g., one of the examples 62 to 63) or to any of the examples described herein, further comprising that the information for the error correction code comprises signal statistics.

Another example (e.g., example 65) relates to a previously described example (e.g., one of the examples 62 to 64) or to any of the examples described herein, further comprising that the receiver method comprises decoding (370) payload data within the data burst using a soft decision error correction decoder.

Another example (e.g., example 66) relates to a previously described example (e.g., example 65) or to any of the examples described herein, further comprising that the receiver method comprises decoding (370) the payload information based on signal statistics included in the information for the error correction code.

Another example (e.g., example 67) relates to a previously described example (e.g., one of the examples 65 to 66) or to any of the examples described herein, further comprising that the receiver method comprises determining (350) Log-Likelihood Ratio values representing the payload data based on signal statistics included in the information for the error correction code.

Another example (e.g., example 68) relates to a previously described example (e.g., one of the examples 65 to 67) or to any of the examples described herein, further comprising that the soft decision error correction decoder is based on a LDPC code.

Another example (e.g., example 69) relates to a previously described example (e.g., one of the examples 62 to 68) or to any of the examples described herein, further comprising that the receiver method comprises training (360) the non-linear equalizer using the predetermined signal sequence (e.g., the pseudo-random signal sequence), and using the trained non-linear equalizer for the data burst.

Another example (e.g., example 70) relates to a previously described example (e.g., one of the examples 62 to 69) or to any of the examples described herein, further comprising that the preamble comprises a third subsection.

Another example (e.g., example 71) relates to a previously described example (e.g., example 70) or to any of the examples described herein, further comprising that the receiver method comprises determining (330) the information for the error correction code using the predetermined signal sequence of the preamble, and determining the information for the non-linear equalizer using the third subsection of the preamble.

Another example (e.g., example 72) relates to a previously described example (e.g., one of the examples 70 to 71) or to any of the examples described herein, further comprising that the third subsection comprises a predetermined signal sequence, such as a pseudorandom signal sequence that is generated according to a generation algorithm.

Another example (e.g., example 73) relates to a previously described example (e.g., one of the examples 62 to 72) or to any of the examples described herein, further comprising that the receiver method comprises receiving (320) the data burst from an optical networking unit of a passive optical network.

Another example (e.g., example 74) relates to a previously described example (e.g., example 73) or to any of the examples described herein, further comprising that the receiver method comprises transmitting (310) a preamble configuration message to the optical networking unit, wherein the received data burst is based on the preamble configuration message.

Another example (e.g., example 75) relates to a previously described example (e.g., one of the examples 62 to 74) or to any of the examples described herein, further comprising that the receiver method comprises receiving (320) a plurality of data bursts from one or more optical networking units of a passive optical network, and determining (330) the information for the error correction code or the information for a non-linear equalizer separately for each optical networking unit or separately for each data burst.

Another example (e.g., example 76) relates to a previously described example (e.g., example 75) or to any of the examples described herein, further comprising that the receiver method comprises receiving (320) the plurality of data bursts from a plurality of optical networking units, and transmitting (310) separate preamble configuration messages to the plurality of optical networking units.

An example (e.g., example 77) relates to a network transmitter (35), configured to transmit a preamble configuration message to a network unit of an optical network, the preamble configuration message comprising information on an algorithm to be used to generate a predetermined signal sequence of a subsection of the preamble and information on a length of the predetermined signal sequence.

Another example (e.g., example 78) relates to a previously described example (e.g., example 77) or to any of the examples described herein, further comprising that the preamble configuration message comprises information on one or more of a number of subsections of the preamble, a length of a repetitive signal pattern to be repeated within a further subsection of the preamble, a pattern of the repetitive signal pattern, a number or repetitions of the repetitive signal pattern, a generator polynomial of the predetermined signal sequence (e.g., of a pseudorandom signal sequence corresponding to the predetermined signal sequence), an initialization seed of the predetermined signal sequence (e.g., of a pseudorandom signal sequence corresponding to the predetermined signal sequence), and a length of the generator polynomial.

Another example (e.g., example 79) relates to a previously described example (e.g., one of the examples 77 to 78) or to any of the examples described herein, further comprising that the network transmitter is configured to transmit separate preamble configuration messages to a plurality of optical networking units.

An example (e.g., example 80) relates to a network transmitter device (35), comprising means for processing configured to transmit a preamble configuration message to a network unit of an optical network, the preamble configuration message comprising information on an algorithm to be used to generate a predetermined signal sequence of a subsection of the preamble and information on a length of the predetermined signal sequence.

An example (e.g., example 81) relates to an Optical Line Terminal (300) for a Passive Optical Network comprising the network transmitter (35) or network transmitter device (35) according to one of the examples 77 to 79.

Another example (e.g., example 82) relates to a previously described example (e.g., one of the examples 43 to 58) or to any of the examples described herein, further comprising that An example (e.g., example 83) relates to a network transmitter method, comprising transmitting (310) a preamble configuration message to a network unit of an optical network, the preamble configuration message comprising information on an algorithm to be used to generate a predetermined signal sequence, such as a pseudorandom signal sequence that is generated according to a generation algorithm, of a subsection of the preamble and information on a length of the predetermined signal sequence.

Another example (e.g., example 84) relates to a previously described example (e.g., example 83) or to any of the examples described herein, further comprising that the preamble configuration message comprises information on one or more of a number of subsections of the preamble, a length of a repetitive signal pattern to be repeated within a further subsection of the preamble, a pattern of the repetitive signal pattern, a number or repetitions of the repetitive signal pattern, a generator polynomial of the predetermined signal sequence (e.g., of a pseudorandom signal sequence corresponding to the predetermined signal sequence), an initialization seed of the predetermined signal sequence (e.g., of a pseudorandom signal sequence corresponding to the predetermined signal sequence), and a length of the generator polynomial.

Another example (e.g., example 85) relates to a previously described example (e.g., one of the examples 83 to 84) or to any of the examples described herein, further comprising that the network transmitter method comprises transmitting (310) separate preamble configuration messages to a plurality of optical networking units.

An example (e.g., example 86) relates to a machine-readable storage medium including program code, when executed, to cause a machine to perform the method of one of the examples 18 to 32, the receiver method according to one of the examples 62 to 76, or the network transmitter method according to one of the examples 83 to 85.

An example (e.g., example 87) relates to a computer program having a program code for performing the method of one of the examples 18 to 32, the receiver method according to one of the examples 62 to 76, or the network transmitter method according to one of the examples 83 to 85, when the computer program is executed on a computer, a processor, or a programmable hardware component.

An example (e.g., example 88) relates to a machine-readable storage including machine readable instructions, when executed, to implement a method or realize an apparatus as claimed in any pending claim or described in any example.

An example (e.g. example A1) relates to a method to generate a preamble for a communication over an optical network, comprising generating a first subsection of the preamble, the first subsection of the preamble comprising a repetitive signal pattern; and generating a second subsection of the preamble subsequent to the first subsection, the second subsection comprising a pseudorandom signal sequence (e.g., the predetermined signal sequence).

Another example (e.g. example A2) relates to a previously described example (e.g. example A1) further comprising generating a (further) predetermined signal sequence serving as a delimiter at the end of the first subsection.

Another example (e.g. example A3) relates to a previously described example (e.g. example A1 or A2) further comprising generating a third subsection of the preamble subsequent to the second subsection, the third subsection comprising a pseudorandom signal sequence.

Another example (e.g. example A4) relates to a previously described example (e.g. one of examples A1 to A3) further comprising that the end of the second subsection consists of the (further) predetermined signal sequence serving as a delimiter.

Another example (e.g. example A5) relates to a previously described example (e.g. one of examples A1 to A4) further comprising that preamble of is generated for an upstream communication in a passive optical network.

An example (e.g. example A6) relates to a data stream for transmission over an optical network, comprising a preamble having a first subsection comprising a repetitive signal pattern; and a second subsection of the preamble subsequent to the first subsection, the second subsection comprising a pseudorandom signal sequence (e.g., the predetermined signal sequence).

Another example (e.g. example A7) relates to a previously described example (e.g. example A6) further comprising a (further) predetermined signal sequence serving as a delimiter at the end of the first subsection.

Another example (e.g. example A8) relates to a previously described example (e.g. one of examples A6 or A7) further comprising that a third subsection of the preamble subsequent to the second subsection, the third subsection comprising a pseudorandom signal sequence (e.g., the predetermined signal sequence).

Another example (e.g. example A9) relates to a previously described example (e.g. one of examples A6 to A8) further comprising that the (further) predetermined signal sequence serving as a delimiter at the end of the second subsection.

Another example (e.g. example A10) relates to a previously described example (e.g. one of examples A6 to A9) further comprising that the data stream is used for an upstream communication in a passive optical network.

An example (e.g., example A11) relates to a transmitter for an optical network, configured to transmit a data burst comprising a preamble, the preamble comprising a first subsection comprising a repetitive signal pattern; and a second subsection of the preamble subsequent to the first subsection, the second subsection comprising a pseudorandom signal sequence (e.g., the predetermined signal sequence).

Another example (e.g. example A12) relates to a previously described example (e.g. example A11) further comprising that the preamble further comprises a (further) predetermined signal sequence serving as a delimiter at the end of the first subsection.

Another example (e.g. example A13) relates to a previously described example (e.g. one of examples A11 or A12) further comprises that the preamble further comprises a third subsection subsequent to the second subsection, the third subsection comprising a pseudorandom signal sequence (e.g., the predetermined signal sequence).

Another example (e.g. example A14) relates to a previously described example (e.g. one of examples A11 to A13) further comprising that the preamble further comprises the (further) predetermined signal sequence serving as a delimiter at the end of the second subsection.

An example (e.g., example A15) relates to a receiver for an optical network, configured to receive a data burst comprising a preamble, the preamble comprising a first subsection comprising a repetitive signal pattern; and a second subsection of the preamble subsequent to the first subsection, the second subsection comprising a pseudorandom signal sequence (e.g., the predetermined signal sequence); and to determine information for an error correction code using the pseudorandom signal sequence of the preamble.

Another example (e.g. example A16) relates to a previously described example (e.g. example A15) further comprising that the information for the error correction code of comprises signal statistics.

Another example (e.g. example A17) relates to a previously described example (e.g. one of examples A15 or A16) further comprising that the receiver is further configured to decode payload data within the data burst using a soft decision error correction decoder.

Another example (e.g. example A18) relates to a previously described example (e.g. example A17) further comprising that the soft decision error correction decoder of example 17 is based in a LDPC code.

An example (e.g., example A19) relates to a network transmitter configured to transmit a preamble configuration message to a network unit of an optical network, the preamble configuration message comprising information on an algorithm to be used to generate a pseudorandom signal sequence (e.g., the predetermined signal sequence); and information on a length of the pseudorandom signal sequence.

Another example (e.g. example A20) relates to a previously described example (e.g. example A19) further comprising that, the information on the algorithm comprises a generator polynomial.

Another example (e.g. example A21) relates to a previously described example (e.g. one of examples A19 or A20) further comprising that, the information on the algorithm comprises a seed for a predetermined generator polynomial.

Another example (e.g. example A22) relates to a previously described example (e.g. one of examples A19 to A21) further comprising that, the preamble configuration message further comprises a signal pattern to be repeated within a subsection of the preamble; and a length of the subsection or a number of repetitions of the signal pattern within the preamble.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A preamble generation apparatus for generating a preamble for a communication from an optical network unit to an optical line terminal over an optical network, the preamble generation apparatus comprising interface circuitry and processing circuitry configured to:
   receive a preamble configuration message from the optical line terminal, wherein the preamble configuration message comprises at least one of a generator polynomial and an initialization seed;
   generate a first subsection of the preamble, the first subsection of the preamble comprising a repetitive signal pattern;
   generate a second subsection of the preamble subsequent to the first subsection, the second subsection comprising a predetermined signal sequence, wherein the predetermined signal sequence is generated based on the preamble configuration message.

2. The preamble generation apparatus according to claim 1, wherein the predetermined signal sequence is a pseudo-random signal sequence that is generated according to a generation algorithm.

3. The preamble generation apparatus according to claim 1, wherein the preamble generation apparatus is configured to generate a further predetermined signal sequence serving as a delimiter at the end of the first subsection.

4. The preamble generation apparatus according to claim 1, wherein the preamble generation apparatus is configured to generate a third subsection of the preamble.

5. The preamble generation apparatus according to claim 4, wherein the third subsection is generated subsequent to the second subsection.

6. The preamble generation apparatus according to claim 4, wherein the third subsection is generated subsequent to the first subsection and the second subsection is generated subsequent to the third subsection.

7. The preamble generation apparatus according to claim 1, wherein the preamble is generated for an upstream communication in a passive optical network.

8. The preamble generation apparatus according to claim 1, wherein the preamble generation apparatus is configured to provide the preamble to the optical network unit with at least the first and second subsection.

9. The preamble generation apparatus according to claim 1, wherein the predetermined signal sequence is generated based on the generator polynomial and the initialization seed.

10. The preamble generation apparatus according to claim 1, wherein the preamble configuration message comprises information on one or more of a number of subsections of the preamble, a length of the repetitive signal pattern, a pattern of the repetitive signal pattern, a number or repetitions of the repetitive signal pattern, information on an algorithm to be used to generate the preamble, a generator polynomial of the predetermined signal sequence, an initialization seed of the predetermined signal sequence, a length of the generator polynomial, and the length of the predetermined signal sequence.

11. An optical networking unit for a passive optical network, the optical networking unit comprising the preamble generation apparatus according to claim 1.

12. The preamble generation apparatus according to claim 3, wherein the predetermined signal sequence serves as a delimiter at the end of the second subsection and/or the third subsection.

13. A terminal unit comprising a transmitter and a receiver for an optical network,
   the transmitter configured to:
      transmit a preamble configuration message to a network unit of the optical network, the preamble configuration message comprising information on an algorithm to be used to generate a predetermined signal sequence of a second subsection of the preamble, and
   the receiver comprising configured to:
      receive a data burst comprising the preamble, the preamble comprising a first subsection comprising a repetitive signal pattern, and the second subsection of the preamble subsequent to the first subsection, the second subsection comprising the predetermined signal sequence; and
      determine information for an error correction code or information for a non-linear equalizer using the predetermined signal sequence of the preamble.

14. The terminal unit according to claim 13, wherein the receiver is configured to determine signal statistics to be used for soft-decision forward error correction using the predetermined signal sequence of the preamble.

15. The terminal unit according to claim 13, wherein the receiver is configured to decode payload data within the data burst using a soft decision error correction decoder.

16. The terminal unit according to claim 13, wherein the receiver is configured to determine Log-Likelihood Ratio values representing the payload data based on signal statistics included in the information for the error correction code.

17. The terminal unit according to claim 13, wherein the receiver is configured to train the non-linear equalizer using the predetermined signal sequence, and to use the trained non-linear equalizer for the data burst.

18. The terminal unit according to claim 13, wherein the preamble comprises a third subsection, wherein the receiver is configured to determine the information for the error correction code using the predetermined signal sequence of the preamble and to determine the information for the non-linear equalizer using the third subsection of the preamble.

19. The terminal unit according to claim 13, wherein the receiver is configured to receive a plurality of data bursts from one or more optical networking units of a passive optical network, and to determine the information for the error correction code or the information for a non-linear equalizer separately for each optical networking unit or separately for each data burst.

20. The network transmitter terminal unit according to claim 13 wherein
the preamble configuration message further comprises information on a length of the predetermined signal sequence.

21. The terminal unit according to claim 13, wherein the network transmitter is configured to transmit separate preamble configuration messages to a plurality of optical networking units.

* * * * *